United States Patent
Bell et al.

[11] Patent Number: 5,886,466
[45] Date of Patent: Mar. 23, 1999

[54] MINIATURE TWO-PIN TUNGSTEN HALOGEN LAMP

[75] Inventors: Dean A. Bell, Marcellus; Raymond Alan Dean, Auburn, both of N.Y.

[73] Assignee: Welch Allyn, Inc., Skaneateles Falls, N.Y.

[21] Appl. No.: 780,706

[22] Filed: Jan. 8, 1997

[51] Int. Cl.⁶ .................................................. H01K 1/50
[52] U.S. Cl. ........................... 313/579; 313/569; 313/643
[58] Field of Search .................................. 313/579, 578, 313/569, 570, 637, 643; 445/16, 27

[56] References Cited

U.S. PATENT DOCUMENTS

| | | | |
|---|---|---|---|
| 4,139,794 | 2/1979 | Malm et al. | 313/220 |
| 4,409,516 | 10/1983 | Thomas et al. | 313/579 |
| 5,359,262 | 10/1994 | Bell et al. | 313/579 |

FOREIGN PATENT DOCUMENTS

| | | | |
|---|---|---|---|
| 1 448 005 | 9/1976 | United Kingdom | 313/578 |
| 2 144 579 | 3/1985 | United Kingdom | 313/578 |

*Primary Examiner*—Nimeshkumar D. Patel
*Attorney, Agent, or Firm*—Wall Marjama Bilinski & Burr

[57] ABSTRACT

A miniature two-pin, tungsten-halogen lamp in the shape of a cylindrical envelope formed of high temperature glass having a sealed chamber capable of withstanding internal pressures of between 5 and 20 atmospheres. The diameter of the cylindrical envelope is in the range of 0.250 to 0.313 inches and contains at least one refractory metal filament mounted within the sealed chamber. The metal filament is electrically connected to a pair of leads passing out of the envelope. A fill gas is contained within the sealed chamber and contains an inert gas major constituent and a halide gas minor constituent. The lamp produces an efficacy of up to 26 lumens per watt when operating within a range of from 1.25 to 18 watts.

6 Claims, 3 Drawing Sheets

MINIATURE TWO-PIN TUNGSTEN HALOGEN LAMP

BACKGROUND OF THE INVENTION

This invention relates to a low wattage, tungsten-halogen lamp and, in particular, to a low wattage aluminosilicate glass lamp having improved performance, high efficacy, and long life.

As taught in U.S. Pat. Nos. 4,163,171 and 4,451,760, many incandescent lamps employ the well known tungsten-halogen regenerative cycle. At relatively high operating temperatures, tungsten atoms are evaporated from the filament. These atoms are captured by the halogen gas and return to the filament to replace lost material. A reduction in size of these lamps produces a dramatic increase in thermal loading and a reduction in lamp life and maintenance. Maintenance, as herein used, is defined as the percent of initial lamp light output that is maintained over the life of the lamp. Output, as herein used, is defined as the visible light, 400 to 700 nanometer wavelength, emanating from the lamp. Typically, high lumen per watt lamps in the T-2 to T-2½ range exhibit a marked drop off in maintenance after 15 to 20 hours of operation and generally fail rapidly thereafter.

U.S. Pat. Nos. 4,598,342 discloses a low wattage, tungsten-halogen lamp that employs a double filament arrangement. The filaments are aligned end to end along the axis of the lamp envelope and each is arranged to operate independently of the other. The coils in each filament are spaced further apart at the center of the filament than at each end to provide for a more uniform temperature distribution along the length of each filament. The double filament arrangement increases the thermal loading on the lamp when both filaments are operating. To compensate for the higher than normal loading, the fill gas pressure in the lamp is increased from about 2 to 20 atmospheres. The fill gas contains Xenon which is said to maintain the inactive filament at a cooler temperature (i.e. the one filament is turned off). This prevents halogen in the fill gas from attacking the filament components. The patent does not disclose the fractional percentage of halogen gas contained in the Xenon gas.

The U.S. Pat. No. 5,359,262 discloses sub-miniature tungsten halogen lamps in T-1 to T-1 ¼ range which contain major inert and minor halide gas constituents.

SUMMARY OF THE INVENTION

It is the primary object of this invention to improve miniature tungsten-halogen lamps and, in particular, miniature lamps described as T-2 to T-2½, two-pin hard glass tungsten halogen lamps.

A further object of the present invention is to improve the efficacy of tungsten-halogen lamps for use in miniature applications such as flashlights and other portable lights to enable a very high system efficacy.

A still further object of the present invention is to improve the maintenance of miniature, tungsten-halogen lamps in the in the T-2 to T-2½ range.

Another object of the present invention is to improve the output of the tungsten-halogen lamps for use in miniature applications such as flashlights and other portable lights.

Yet a further object of the present invention is to improve the life of small higher wattage tungsten-halogen lamps suitable for use in portable lights.

Another object of the present invention is to provide a high output, high color temperature, high maintenance, long-life two-pin lamp for use in flashlights and other hand held portable lighting instruments such as lanterns and task lights.

These and other objects of the present invention are attained by a miniature two-pin, tungsten-halogen lamp in the T-2 to T-2½ range having a sealed chamber containing a fill gas at a pressure of between about 5 and 20 atmospheres. The fill gas contains a minor halogen gas constituent and major inert gas constituent (preferably Xenon), minor and major referring to the percent composition of the respective gas. Enhanced lamp performance is obtained by altering the halogen content in the fill gas in relation to the pressure maintained within the lamp.

BRIEF DESCRIPTION OF THE DRAWINGS

For a fuller understanding of these and other objects of the present invention, reference shall be made to the following detailed description of the invention, read in connection with the accompanying drawings, in which.

DETAILED DESCRIPTION OF THE INVENTION

The present invention relates to a tungsten-halogen lamp having a long operating life and greatly enhanced performance and is particularly well suited for use in miniature applications. Miniature lamps of this type generally fall in the T-2 to T-2½ size range. Each whole number in the lamp designation represents a lamp diameter equal to 0.125 inches. Typical miniature incandescent lamps of this type found in prior art for portable lighting applications are made from glass and are typically considered to be krypton lamps or xenon lamps in that they have a tungsten filament operating in an inert gas atmosphere of krypton or xenon. The gas pressure in such lamps is considered low to moderate, typically having a range of 0.8 to 5 atmospheres, respectively. Although generally not considered to be high in performance, they do offer an improvement over older prior art of vacuum incandescent lamps. Miniature incandescent lamps of this type found in prior art typically exhibit a relatively short operating life and reduced lamp maintenance when operated at high lumen per watt levels. The average life for these prior art lamps is typically about 8 to 40 hours. As will be explained in greater detail below, the present lamp is designed to operate at high fill gas pressures and with a lower than normal halogen gas content. It has been found that by increasing the internal pressure of the lamp, while at the same time reducing the amount of halogen contained in the fill gas, a dramatic increase in lamp performance is achieved.

Figure 1:
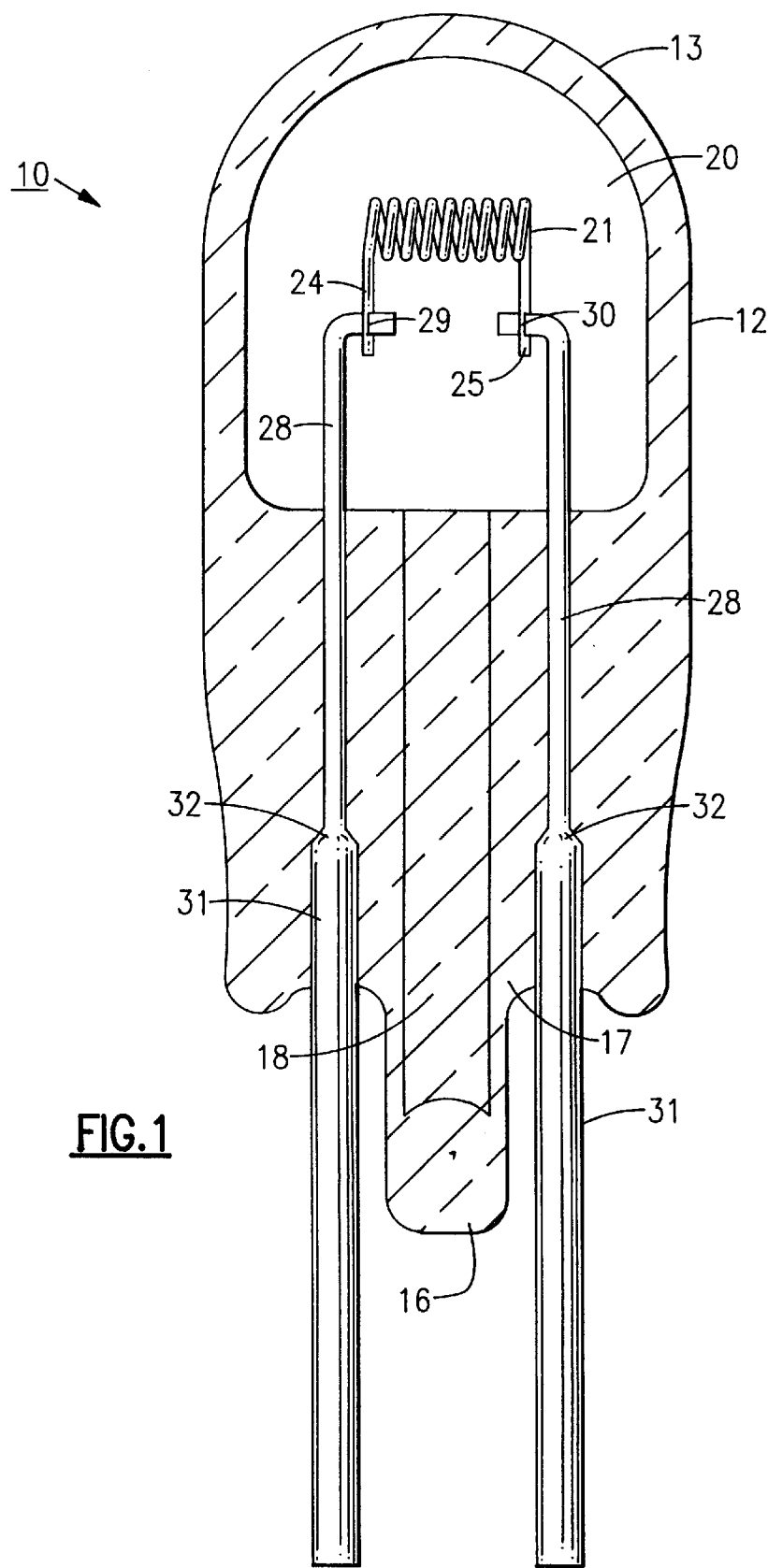
FIG. 1 is an enlarged side elevation of a miniature two-pin, tungsten-halogen lamp embodying the teachings of the present invention.

With reference to FIG. 1, there is shown an enlarged view of a miniature lamp, generally referenced 10, that embodies the teachings of the present invention. The lamp is formed of high temperature glass, preferably an aluminosilicate glass, capable of withstanding high internal gas pressures and high operating temperatures. The lamp includes a cylindrical envelope 12 that terminates at its distal end in an arcuate-shaped dome 13, or alternatively a lens. The opposite end or base of the envelope is melted to form a full hermetic glass seal 17 around the lead wires 28 and securing a pair of nickel plated iron pins 31 which are electrically connected to the lead wires at 32. The pins 31 are sized to fit into an electrical outlet of a portable light such as a flashlight. The seal is also formed around an aluminosilicate glass tube 18 through which the lamp is evacuated and filled with gas. The glass tube 18 is pinched or tipped off at 16 to contain the fill gas within the lamp.

The envelope encloses a chamber 20 containing a coiled tungsten filament 21. The two ends 24 and 25 of the filament are placed on or across the formed end of the lead-in wires 28 and swagged or welded in place at 29 and 30 completing the electrical circuit. Pins 31 are brought out of the envelope through the sealed base and are terminated approximately 1 inch from the top of the lamp. The lead wires 28 preferably are formed of molybdenum. Although not clearly shown in the drawing, the coils of the tungsten filament are uniformly spaced along the entire length of the filament.

The envelope chamber 20 contains a fill gas having a minor halide constituent by percent composition, and a major inert gas constituent of preferably high molecular weight such as xenon gas. It has been found that by raising the internal pressure of the lamp, while at the same time reducing fractional percentages of halogen contained in the fill gas, the performance of the lamp is greatly enhanced when compared to similar miniature lamps found in the art.

The two-pin configuration allows for ease of placement into a lamp socket and therefore eliminates the need for other electrical connections, electrical termination or the requirement for a lamp base. It can therefore be seen that the two pin construction provides for an improved and economical electrical contact for the lamp. Further, the elimination of the lamp base, typically made of metal, reduces the heat sinking of the lamp thereby further improving the lamp performance.

The aluminosilicate glass which comprises the envelope has advantages over quartz lamps because the pressed seal, size of seal top, and top tip-off in quartz envelopes obscure the light emanating from the filament, and limit their utility in systems employing optical reflectors and lenses. Further, the aluminosilicate envelope may be handled with the bare human hand without concern over devitrification. Quartz should not be handled in this manner in that such handling contributes to devitrification.

The present invention provides an advance over U.S. Pat. No. 5,359,262 in that the lamps taught by the '262 patent do not have a sufficiently high output for use as lamps in high output flashlights requiring higher wattage. Furthermore, the small size, (T-1 to T-1¼) of the '262 lamps are not ideally suitable for handling in hand held lamps such as flashlights. In addition, the required higher wattage for high output requires a larger volume envelope, and the thermal stresses which would be caused by the necessary wattage would melt, deform or otherwise destroy the smaller volume envelope taught by the '262 patent, and inactivate the tungsten-halogen cycle.

Figure 2:
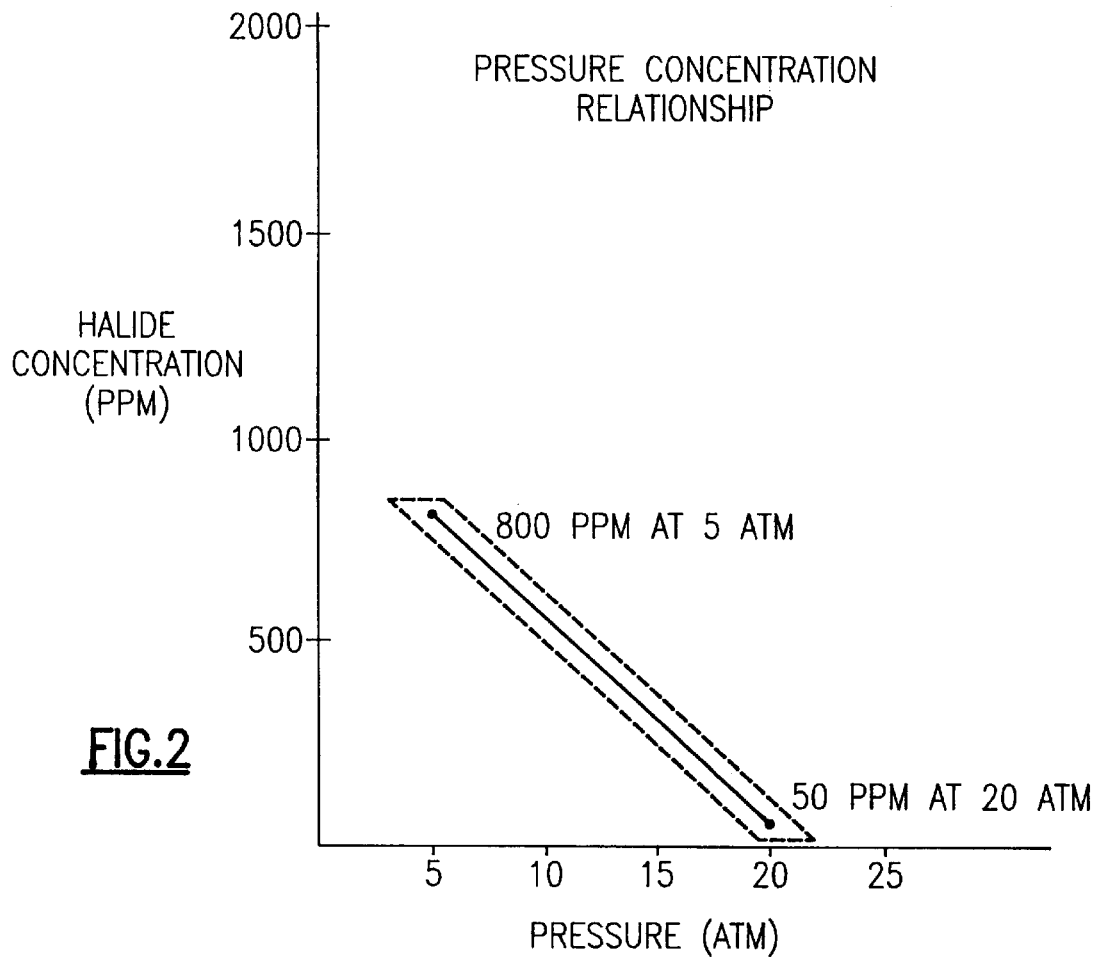
FIG. 2 is a graphic representation of one embodiment of the invention in which the internal pressure of the lamp shown in FIG. 1 is compared to halogen gas content.

To overcome the problems of overactivity of the tungsten halogen cycle at high halogen concentrations, resulting in premature filament failure, and low activity, resulting in poor maintenance or premature darkening of the lamp envelope, a new relationship between pressure and halogen concentration had to be developed to accommodate the desired operating wattage range, the filament mass and the internal gas volume of the lamps in the present invention. FIG. 2 graphically shows the resultant relationship of halide concentration to fill gas pressure utilized in T-2 to T-2½ lamps of the present invention. A near linear relationship between halide concentration and pressure is maintained across the desired pressure range of about 5 atmospheres and 20 atmospheres. At the low end of the range, the fill gas contains 800 parts per million (ppm) of halide gas, while at the upper of the range the halogen content is reduced to 50 ppm. The dotted area surrounding the data line in FIG. 2 illustrates a suitable pressure-concentration region for lamps of the present invention. Tests conducted on such lamps exhibit higher lumens per watt, higher light output, greater maintenance and an extended life. The specific halide selected is dependent upon the lamp duty cycle, degree of heat loss or sinking, thermal loading, filament mass and desired operating life of the lamps. The fill gas composition and the internal fill gas pressure are dependent upon the desired color temperature, lamp wattage, maintenance and expected lamp life.

Empirical results and calculations based on these results indicate clearly that tungsten-halogen lamps in T-2 to T-2½ size configurations are capable of operating within the following performance ranges:

2.5 to 12 volts
0.5 to 1.5 amps
1.25 to 18 watts
1.7 to 42 mean spherical candlepower
3000–3400 deg. K color temperature
10–60 hours life The benefits of the present invention over competitive incandescent lamp technology are considered to be an improvement in high performance and high efficacy. Such improvements may be measured in lumens per watt, maintenance of initial light output, and lamp life. Expected results with this invention are; 17 percent to 24 percent increase in lumens per watt over other prior art halogen lamps, 30 percent to 90 percent increase in lumens per watt over gas filled lamps of krypton or xenon, 85 to 105 percent maintenance of initial light output at 70 percent of life, whereas competitive lamps exhibit 25 percent to 70 percent maintenance, and a 25 percent to 50 percent increase in life over prior art lamps. This considerable improvement in lamp performance is independent of the number of battery cells used to power the lamp in portable lighting applications such as flashlights.

Figure 4:
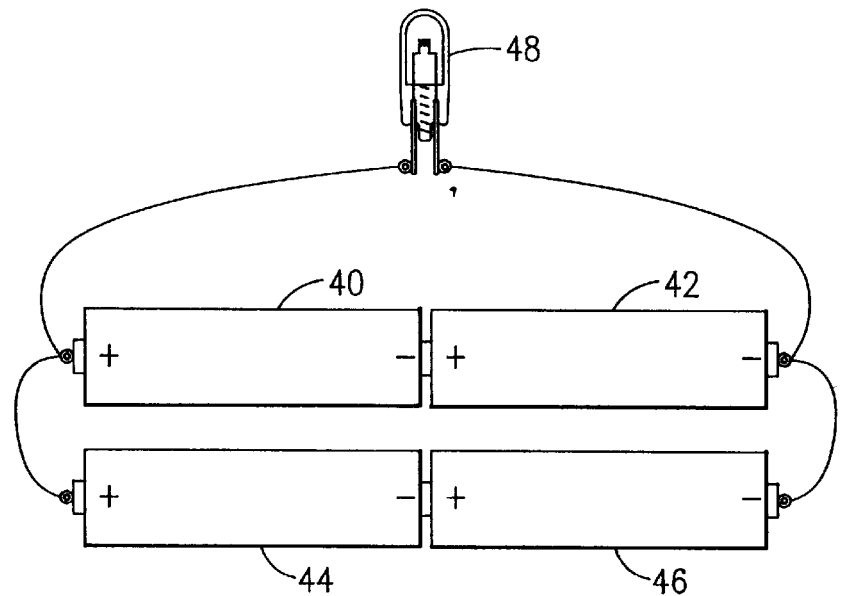
FIG. 4 is a schematic representation of a multiple cell series-parallel configuration for powering lamps of the present invention.

In a preferred application of the present invention, the lamps are used in high output flashlights. In one embodiment, a plurality of batteries operates in a series-parallel configuration as shown schematically in FIG. 4. In this case 4 alkaline battery cells (1.5 volts each) 40, 42, 44 and 46 are employed, each of two paired in series and each pair in parallel. This allows the lamp 48 to operate at 3 volts and 700 milliamperes for 2.1 watts as opposed to 4 alkaline cells in series which would require the lamp to operate at 6 volts and 350 milliamperes for 2.1 watts. This series-parallel battery configuration allows for the optimization of the filament itself in a preferred configuration in that the filament length is shorter by a factor of 2 thus enabling superior optical efficiency in a lensed and/or reflectorized system. Furthermore, the filament wire is up to 50 percent larger in diameter, yielding a more robust filament better able to withstand vibration or shock from dropping, and better capable of withstanding current inrush, than that of a lamp used in a strictly series configuration with the wattage being constant.

Lamps of the present invention were used under comparative test conditions with AA size batteries. Ten commercial flashlights were shelf items purchased in stores and were compared to two embodiments of the present invention which used a lamp of the present invention having the following specifications:

Lamp used in the embodiment identified as "6 AA DB"
Two-Pin configuration
T-2¼ size
4.20 volts
0.700 amps
2.94 watts
24.20 mean spherical candlepower
3280 deg. K color temperature
40 hours life Lamp used in the embodiment identified as "8 AA DB"
Two-Pin configuration
T 2¼ size
5.50 volts
0.700 amps
3.85 watts
6.30 mean spherical candlepower
3280 deg. K color temperature
40 hours life The various flashlights tested and the number of cells are listed in the table below.

AA FLASHLIGHT OUTPUT TEST

| Flashlight Test Identification | Manufacturer | Model/Trade Name | Cell Size | Number of Cells |
|---|---|---|---|---|
| 6 AA DB | Eveready | 6AA Double Barrel | AA | 6 |
| 8 AA DB | Eveready | 8AA Double Barrel | AA | 8 |
| 2 AA Mag | Mag Instrument | Mini-Mag | AA | 2 |
| 4 AA Hubbell | Hubbell | Hubbellite 2404-2A | AA | 4 |
| Coleman | Coleman | 2 AA | AA | 2 |
| ROV Sport | Ray-O-Vac | Sportsman | AA | 2 |
| ROV Work | Ray-O-Vac | Workhorse | AA | 2 |
| ROV Ind | Ray-O-Vac | Industrial | AA | 2 |
| Lumilite | Lumilite | 2 AA Grip | AA | 2 |
| Garrity | Garrity | 2 AA Tuff Lite | AA | 2 |
| Brinkmann | Brinkmann | 2 AA BlackMax | AA | 2 |
| Streamlight | Streamlight | 2 AA Stream-light JR. | AA | 2 |

Note: All cells used were Eveready Energizer "AA" alkalines (1.5 volts each).

Figure 3:
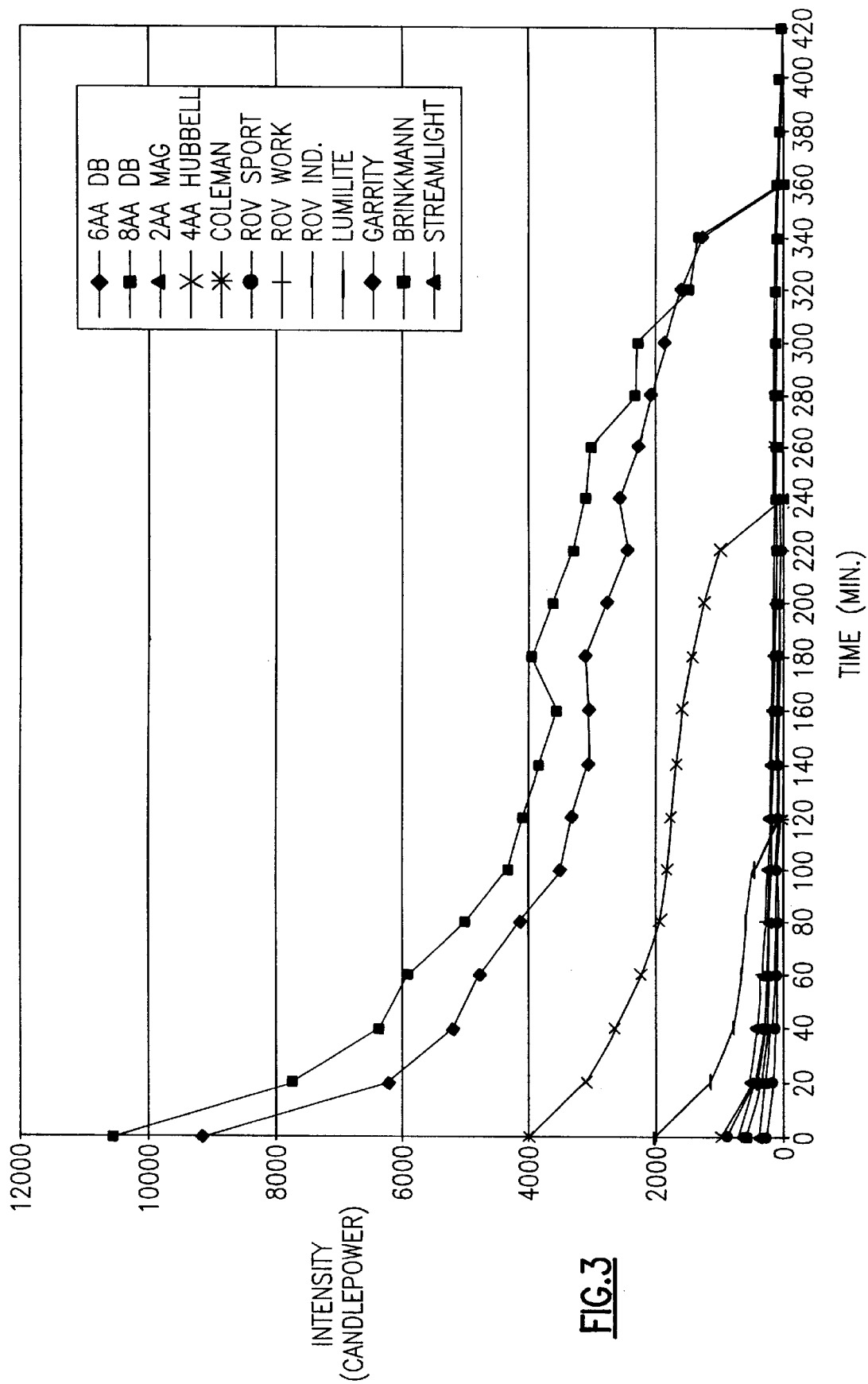
FIG. 3 is a graphic comparison of the present invention to the prior art in the form of foot candle measurements in flashlights using AA size batteries.

The results of these comparative tests are represented graphically in FIG. 3.

As can be seen from the above comparative data, flashlights using the lamps of the present invention show the following benefits and/or improvement over competitive flashlights using lamps of the prior art. A factor of 2.6 times higher initial output than the nearest competitive lamp and a factor of 9.6 times higher initial output than the competitive lamps on average. At 60 minutes of continuous operation, the lamps of the present invention have higher light output by a factor of 3.0 times higher than the nearest competitive lamp and a factor of 10.9 times higher than the nearest competitive lamps on average. At 120 minutes of continuous operation, the lamps of the present invention have higher light output by a factor of 2.3 times higher than the nearest competitive lamp and a factor of 15 times higher than the competitive lamps on average. This comparative testing illustrates capabilities in improvement in system performance in terms of light output and the sustaining of the same over time as a result of the lamps of the present invention.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. A miniature two-pin, tungsten-halogen lamp comprising:

a cylindrical envelope having a given diameter and formed of high temperature glass having a sealed chamber capable of withstanding internal pressures of between 5 and 20 atmospheres, the diameter of said cylindrical envelope being in the range of 0.250 to 0.313 inches;

at least one refractory metal filament mounted within said sealed chamber, said at least one refractory metal filament being electrically connected to a pair of lead wires which are electrically connected to a pair of plug-in connector pins which pass out of the envelope, said pins being suitable for direct electrical contact for said a fill gas contained within said sealed chamber at a pressure between 5 and 20 atmospheres;

said fill gas containing an inert gas major constituent and a halide gas minor constituent, having a fractional percentage of halide gas being linearly related to the pressure of said fill gas and varying within the range of from 800 ppm at 5 atmospheres to 50 ppm at 20 atmospheres, with said lamp producing up to about 468 lumens of light.

2. The lamp of claim 1 in which the maintenance of initial light output at 70 percent of life is about 85 to 105 percent.

3. The lamp of claim 1 wherein the major gas constituent is Xenon.

4. The lamp of claim 1 wherein the envelope is formed of an aluminosilicate glass and the filament is formed of tungsten.

5. A hand held light which includes a plurality of batteries electrically connected to a miniature plug-in lamp, the improvement comprising a miniature two-pin, tungsten-halogen lamp which includes a cylindrical envelope having a given diameter and formed of high temperature glass having a sealed chamber capable of withstanding internal pressures of between 5 and 20 atmospheres, the diameter of said cylindrical envelope being in the range of 0.250 to 0.313 inches;

at least one refractory metal filament mounted within said sealed chamber, said at least one refractory metal filament being electrically connected to a pair of lead wires which are connected to a pair of plug-in connector pins which pass out of the envelope, said pins being suitable for direct electrical contact for said lamp;

a fill gas contained within said chamber, said fill gas containing an inert gas major constituent and a halide gas minor constituent, having a fractional percentage of halide gas being linearly related to the pressure of said fill gas and varying within the range of from 800 ppm at 5 atmospheres to 50 ppm at 20 atmospheres, with said lamp producing up to about 468 lumens of light.

6. The lamp of claim 5 in which said lamp is operated in a series-parallel battery configuration in order to allow for the use of a preferred filament configuration.

* * * * *

UNITED STATES PATENT AND TRADEMARK OFFICE
CERTIFICATE OF CORRECTION

PATENT NO. : 5,88?,466
DATED : March 23, 1999
INVENTOR(S) : Dean A. Bell et al.

It is certified that error appears in the above—identified patent and that said Letters Patent is hereby corrected as shown below:

Col. 6, Line 23, Claim 1, after "said" please insert -- lamp:--.

Signed and Sealed this

Twenty-fourth Day of August, 1999

Attest:

Q. TODD DICKINSON

*Attesting Officer*  *Acting Commissioner of Patents and Trademarks*